May 16, 1939.  J. E. MILLER  2,158,829
PIPE JOINT PACKING
Filed April 9, 1937
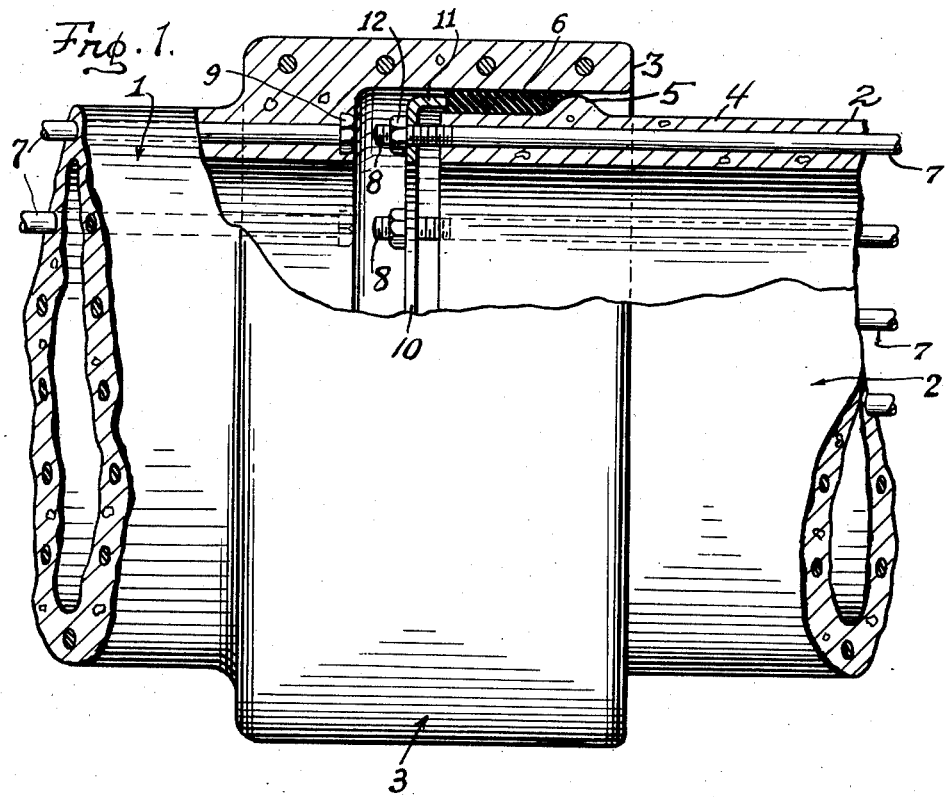
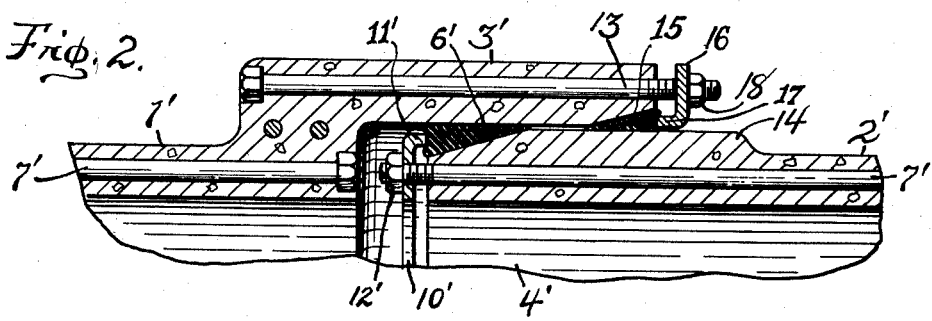
INVENTOR.
Joseph E. Miller
BY
W. G. Burns ATTORNEY.

Patented May 16, 1939

2,158,829

UNITED STATES PATENT OFFICE 2,158,829

PIPE JOINT PACKING

Joseph E. Miller, Oak Park, Ill.

Application April 9, 1937, Serial No. 135,898

2 Claims. (Cl. 285—166)

This invention relates to improvements in pipe joint packing adaptable for piping formed of concrete or other material. In connecting together sections of piping various means have previously been provided, more or less inefficient, for uniting the sections and applying packing to prevent leakage through the joints of the sections where connected together.

An object of the present invention is to afford an elastic or pliant packing for the connected sections of piping, and means for holding in a state of compression a packing disposed between the connected sections to insure a permanently tight fit so that leakage through the joint is forestalled.

Another object of the invention is to construct the piping, the packing and the compressing means so that ordinary flexures of a pipe line formed of the connected sections may occur without impairment of the packed joints.

Other objects and advantages of the invention will appear in the following description.

An illustrative embodiment of the invention is shown in the accompanying drawing, in which:

Fig. 1 is a fragmentary side elevation of the connected ends of pipes, partially in section; and Fig. 2 is a fragmentary longitudinal section showing a modified form of pipe connection in which the invention is embodied.

The illustrative embodiment of the invention is constituted of pipes 1 and 2 of the bell and spigot type. The end portion of the pipe 1 (Fig. 1) is formed with a bell 3 which is adapted to receive the end of a similar pipe 2 so formed at one end as to constitute a spigot 4. A bead 5 is formed on the exterior surface of the spigot at a point spaced suitably distant from the end of said spigot, said bead being formed so as to completely encompass the pipe 2. The bead 5 and the pipe 2 are so proportioned relative to the bell that when the spigot of the pipe 2 is inserted into the bell 3 the periphery of the bead fits snugly but loosely within the bore of the bell, and that portion of the pipe 2 that extends from the bead to the end of the spigot is of such lesser diameter than the bore of the bell as to permit placement of an encircling packing band 6 thereon. The band preferably is formed of any suitable elastic or pliant material such as soft vulcanized rubber.

The pipes 1 and 2 have in their walls reenforce rods 7 longitudinally disposed therein. The ends 8 of said rods extend beyond the corresponding ends of the spigot and are threaded. The opposite ends of said rods 7 are provided with heads 9 that preferably are embedded in the concrete mass forming the bell end of the pipe.

Upon the threaded projecting ends 7 of the reenforce rods is mounted a ring 10 having an axial flange 11 so disposed as to bear against the adjacent end of the packing band 6. Nuts 12 are applied on the projecting ends of the reenforce rods 7 and act when tightened against the ring 10 so that the ring is forced toward the end of the spigot and the packing band thereupon is compressed between the exterior wall of the spigot and the interior wall of the bell and against the bead 5. In this manner a leak-proof joint is made between the bell of the pipe 1 and the spigot end of the pipe 2.

In Fig. 2 is shown a modification of the invention. In this form the bell 3' of the pipe 1' has embedded therein an annular series of longitudinally disposed anchor-bolts 13 (one only of which is shown), the forward ends of which bolts project beyond the outer end of the bell, and are threaded. One end of the pipe 2' constitutes a spigot and preferably there is formed around one end thereof an enlargement 14 so proportioned as to fit within the bore of the bell 3' when said pipes are placed together. The forward end of the enlargement preferably is tapered diametrically inward toward its end, and the bore of the bell 3' is tapered outwardly. Each of the pipes 1' and 2' have embedded in their walls reenforce rods 7' disposed as in the former instance, and also there is provided a metallic ring 10' having an axial flange 11' so disposed as to bear against the adjacent end of a packing band 6' which is positioned on the tapered end of the spigot and bears against the inner wall of the bell 3'. Nuts 12' are applied on the projecting ends of the reenforce rods 7' and act when tightened against the ring 10' so that the ring is forced toward the end of the spigot and the packing band 6' is thereupon compressed between the exterior wall of the spigot and the interior wall of the bell. In this manner the packing band 6' becomes firmly wedged between the spigot and bell and a tight joint between the pipes is thereby formed. Also, there is provided a second packing band 15 that is disposed between the enlargement 14 and the tapered inner wall of the bell 3', and upon the outer projecting threaded ends of the bolts 13 is disposed an annular ring 16 having an axial flange 17 positioned against the outer end of the packing band 15. Nuts 18 on the outer ends of the bolts 13, when tightened against the ring 16, causes the packing band 15 to become wedged tightly between the enlargement 14 and the inner wall of the bell 3. In this manner a second safeguard against leakage from the piping through the points of its sections is afforded.

*Operation*

In using the invention in the form shown in Fig. 1, the pipes 1 and 2 are initially positioned approximately in axial alinement spaced apart and the packing band 6 is placed around the end of the spigot 4. The ring 10 is then positioned loosely upon the extending ends of the reenforcing rods 7 and the nuts 12 are loosely applied to said rods. Following this preparation the pipe 2 is axially moved relative to the pipe 1 so that the spigot is thrust into the bell and the bead 5 is encompassed by the bell. The nuts 12 are then tightened against the ring 10, thereupon causing the packing band to become compressed between the spigot and the bell to form a tight joint between said pipes.

In the form shown in Fig. 2, the pipes 1' and 2' are initially positioned approximately in axial alinement spaced apart and the packing band 6' is placed around the end of the spigot 4', and the packing band 15 is positioned around the enlargement at a point spaced back from the band 6'. The ring 10 is then positioned loosely upon the extending ends of the reenforce rods 7' and the nuts 12' are loosely applied to said rods. Following this preparation, the pipe 2' is axially moved relative to the pipe 1' so that the spigot is thrust into the bell and the packing bands 6' and 15 are encompassed thereby. The ring 16 is then positioned on the extending ends of the bolts 13 and the nuts 18 are then tightened against the ring 16, whereupon the packing band 15 is compressed between the enlargement and the tapered wall of the bell, and also the nuts 12' are then tightened against the ring 10', whereupon the packing band 6' is compressed between the spigot and the bell. Thus is formed a tight joint between said pipes.

In the form shown in Fig. 3, the pipes 1" and 2" are initially placed approximately in axial alinement spaced apart and the packing band 19 is placed around the end of the spigot 4". Following this preparation the pipe 2" is axially moved relative to the pipe 1" so that the spigot and the packing band are thrust into the bell. The ring 16' is then positioned on the extending ends of the bolts 13' and the nuts 18' are tightened against the ring, whereupon the flange 17' on said ring is forced between the spigot and bell against the packing band causing the band to become compressed between the spigot and bell. Upon compression of the packing band the end thereof that abuts the grooved end of the pipe 1" tends to expand into the space between the abutting ends of the pipes, thus forming a seal therebetween to prevent leakage through the joint thus formed.

The idea of the invention is to confine an elastic or pliant packing between the inner wall of the bell of one pipe and the outer wall of the spigot on another pipe inserted in the bell, and then applying pressure by a suitable means to the packing whereby to compress the confined packing to prevent leakage through the pipe joint. The packed pipe joints thus formed permit limited relative movement of the joined pipe sections without rupture of the joints. Thus, when the pipe line is subjected to flexure occasioned by settlement of the pipe line in its trench or by earth movements occasioned naturally or artificially, the joints of the piping remain unimpaired.

The several forms of the invention herein set forth are merely exemplary and are subject to such further modifications that may readily be resorted to by exercise of skill upon the part of those familiar with the art.

What I claim is:

1. Concrete piping constituted of pipe sections of the bell and spigot type joined together, said pipes having reenforce rods in their walls that project beyond the ends of their spigots, compressible packing bands surrounding the end portions of the spigots, and means associated with the ends of said rods engageable with said bands for applying pressure to said bands, so that when the spigot of one pipe is thrust into the bell of another pipe and pressure is applied to the corresponding bands by said means a tight joint is formed therebetween.

2. Means for sealing joints between concrete pipes of the bell and spigot type, each pipe having longitudinally disposed reenforce parts that project beyond one end of said pipe, the spigot of said pipe having an external annular bead spaced from the end thereof, elastic packing disposed within the bell of one pipe and surrounding the spigot of another pipe when said spigot is inserted into said bell, and means associated with said parts for compressing said packing against said bead whereby a tight joint between said pipes is established.

JOSEPH E. MILLER.